A. R. ANGUS.
RAILWAY SAFE RUNNING DEVICE.
APPLICATION FILED JULY 15, 1913.
1,207,676.
Patented Dec. 5, 1916.
10 SHEETS—SHEET 1.
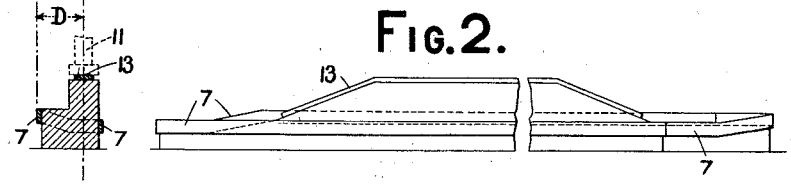
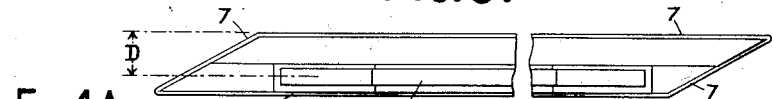
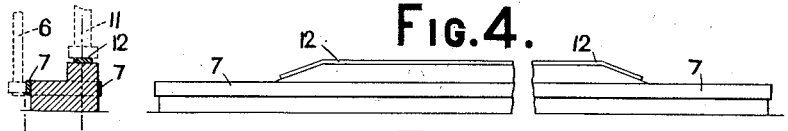
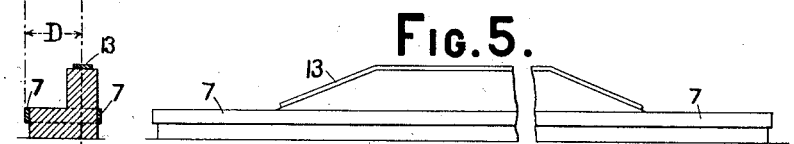
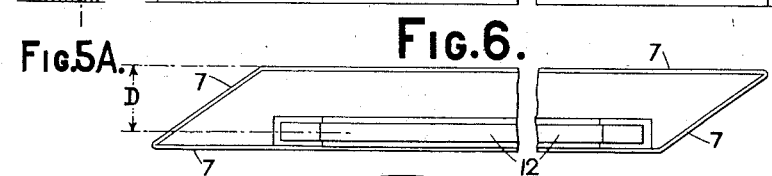
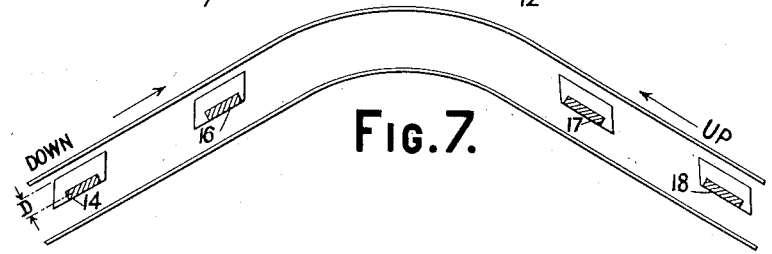
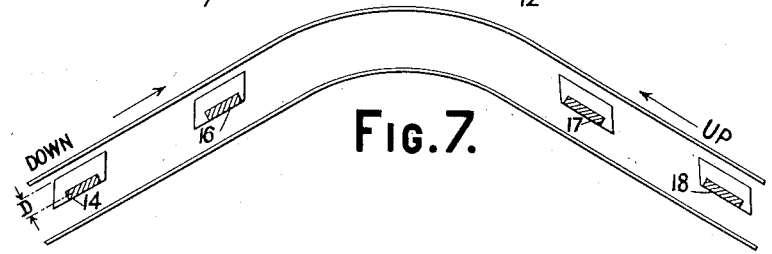
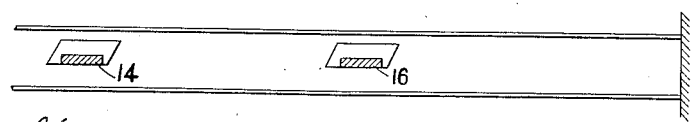
Witnesses:
W. A. Prescott.
Geo. E. Corsellis.
Inventor:
Arthur Reginald Angus.

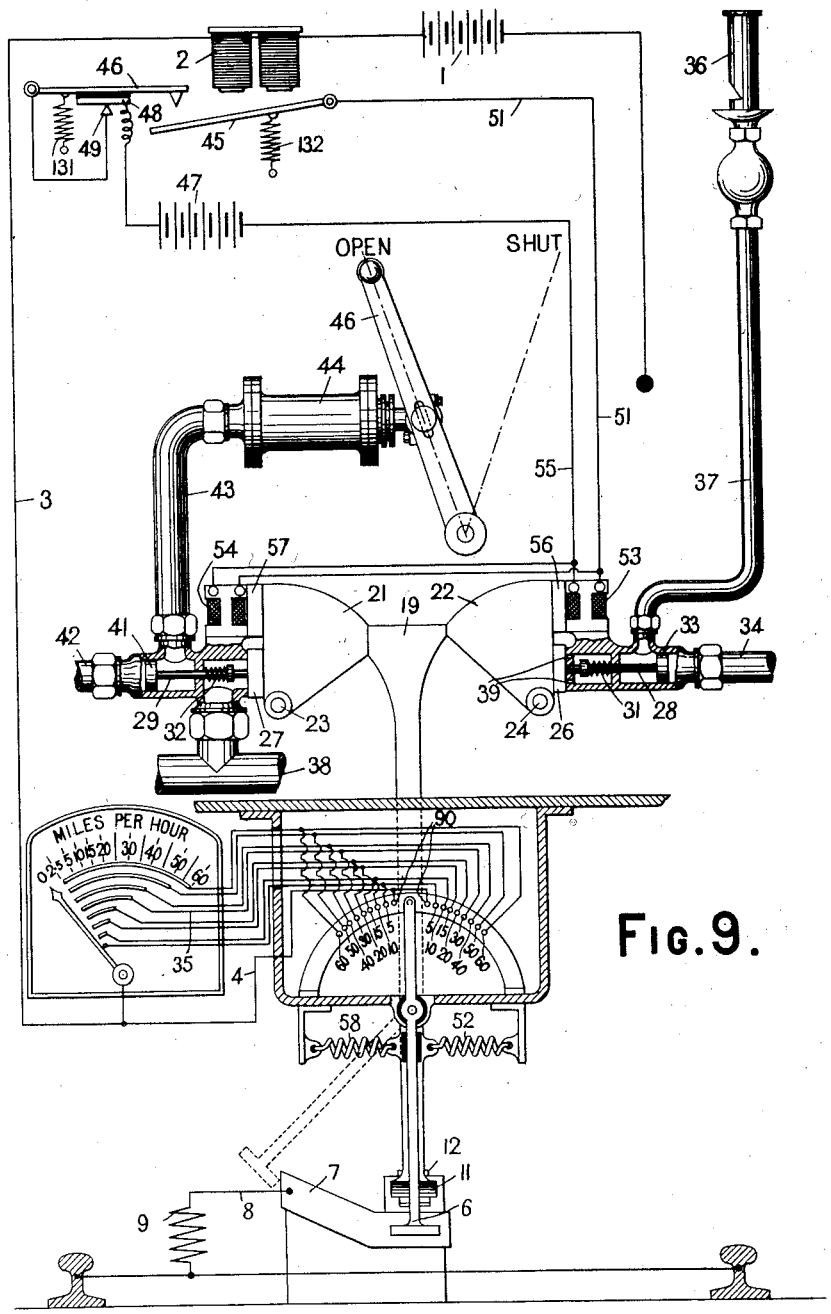

Fig. II.

A. R. ANGUS.
RAILWAY SAFE RUNNING DEVICE.
APPLICATION FILED JULY 15, 1913.

1,207,676.

Patented Dec. 5, 1916.
10 SHEETS—SHEET 6.

A. R. ANGUS.
RAILWAY SAFE RUNNING DEVICE.
APPLICATION FILED JULY 15, 1913.

1,207,676.

Patented Dec. 5, 1916.
10 SHEETS—SHEET 7.

FIG. 14.
FIG. 14A.

A. R. ANGUS.
RAILWAY SAFE RUNNING DEVICE.
APPLICATION FILED JULY 15, 1913.
1,207,676.
Patented Dec. 5, 1916.
10 SHEETS—SHEET 8.
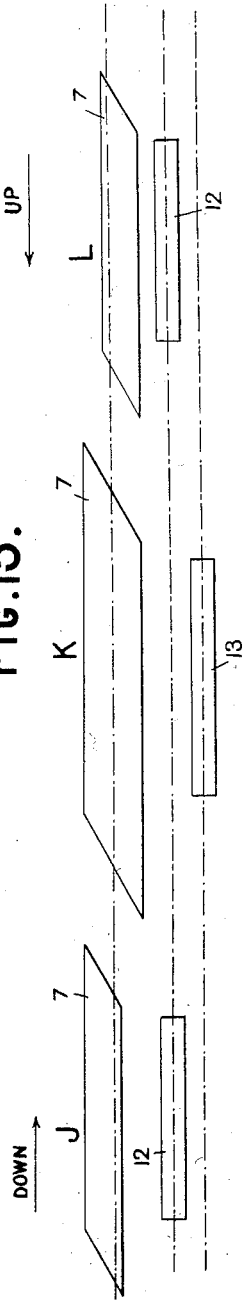
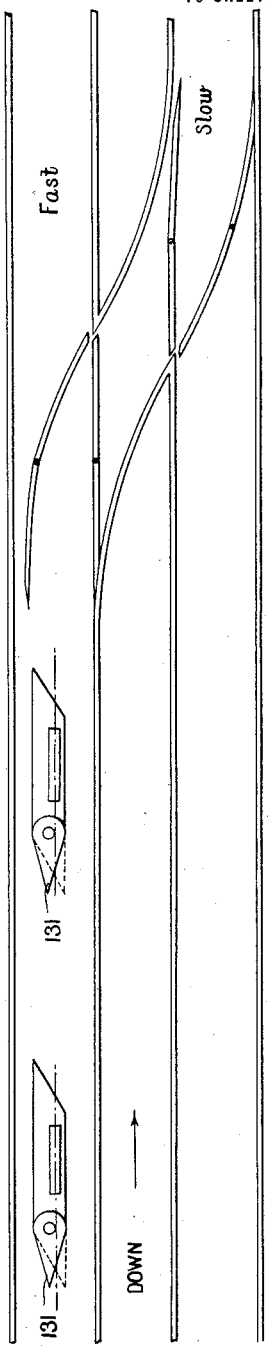
Inventor:
Arthur Reginald Angus

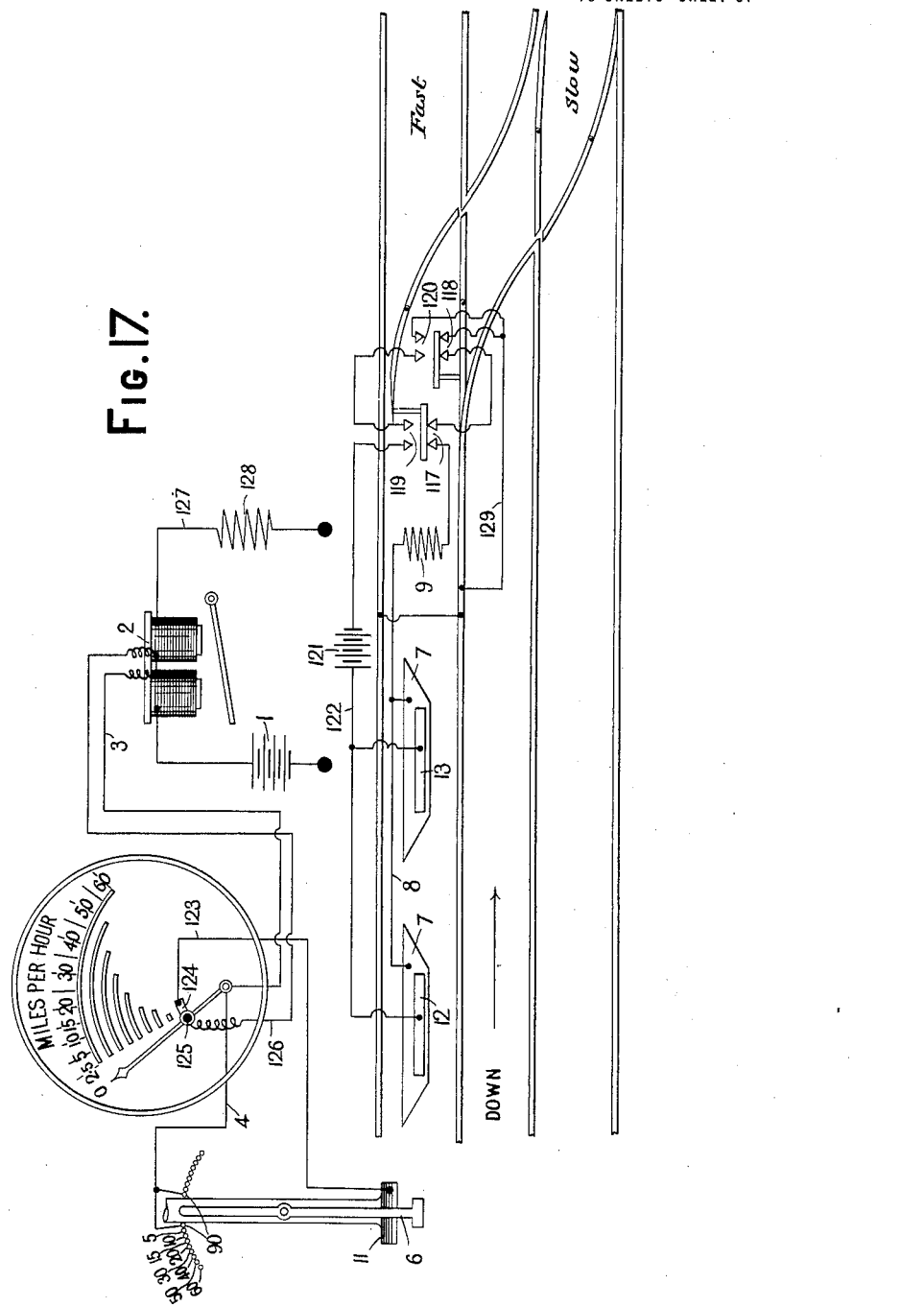

A. R. ANGUS.
RAILWAY SAFE RUNNING DEVICE.
APPLICATION FILED JULY 15, 1913.

1,207,676.

Patented Dec. 5, 1916.
10 SHEETS—SHEET 10.

UNITED STATES PATENT OFFICE.

ARTHUR REGINALD ANGUS, OF MINEHEAD, ENGLAND.

RAILWAY SAFE-RUNNING DEVICE.

1,207,676. Specification of Letters Patent. Patented Dec. 5, 1916.

Application filed July 15, 1913. Serial No. 779,081.

*To all whom it may concern:*

Be it known that I, ARTHUR REGINALD ANGUS, of Glenmore House, Glenmore Road, Minehead, in the county of Somerset, England, solicitor, have invented a certain new and useful invention entitled Improvements in or Relating to Railway Safe-Running Devices, of which the following is a specification.

According to this invention means are provided for producing a warning or a stopping operation on a train when it travels at a greater than a predetermined maximum speed when a limitation of speed to a certain maximum is essential to the safe running of the train for example, when a train is about to run on a curved portion of the track, or is approaching a dead end of the track, or is about to run from a line whereon it may run with unlimited speed on to a line whereon it should not exceed a definite speed limit.

Apparatus according to this invention comprises train apparatus and track apparatus such that a contacting device on the train is moved by a track contact into a position corresponding to the predetermined maximum speed at that track contact, and a warning or a stopping operation is effected on the train if a device whose position is dependent on the speed of the train is not then located in a position corresponding to a speed which is not above the predetermined maximum speed.

The invention, which comprises the various features defined in the claiming clauses hereof, is illustrated by the accompanying drawings which represent by way of example apparatus constructed and arranged in accordance therewith.

Figure 10:
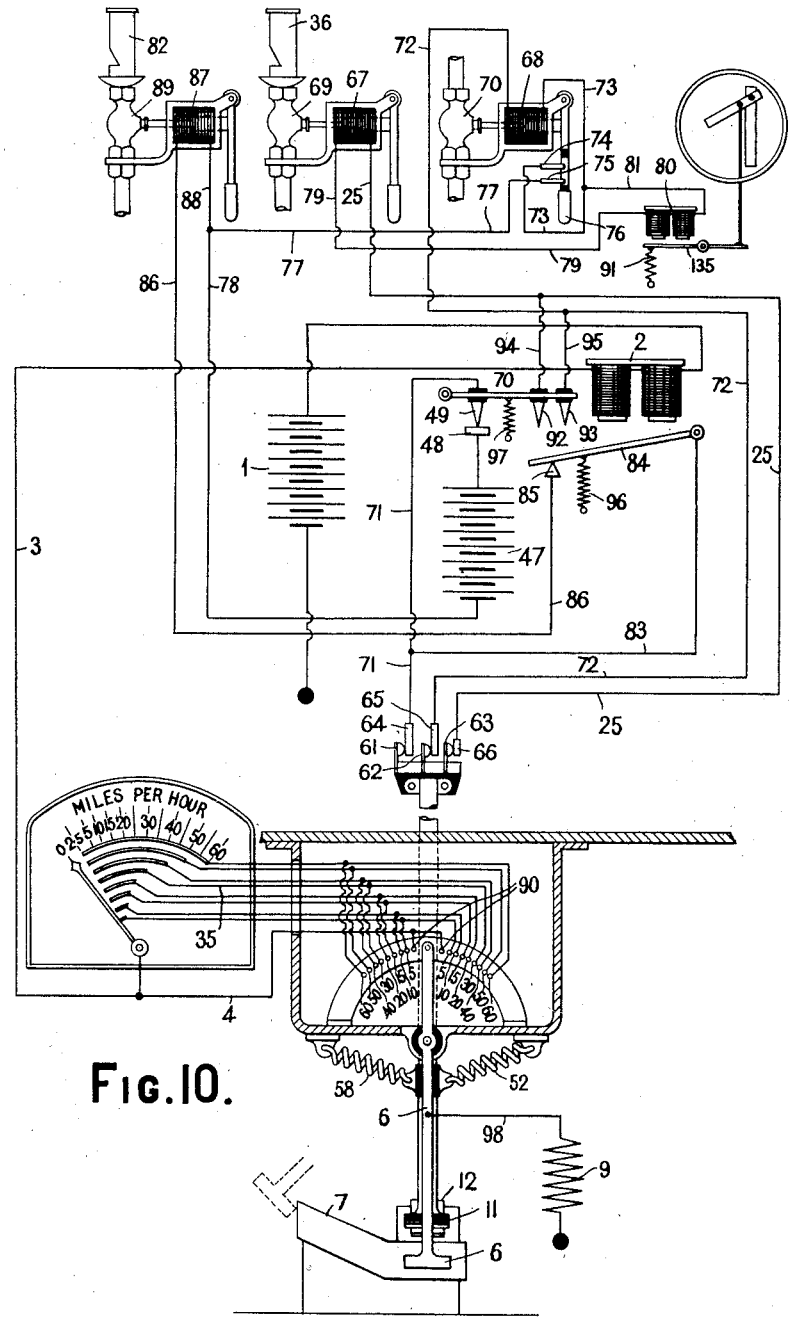
Figure 11:
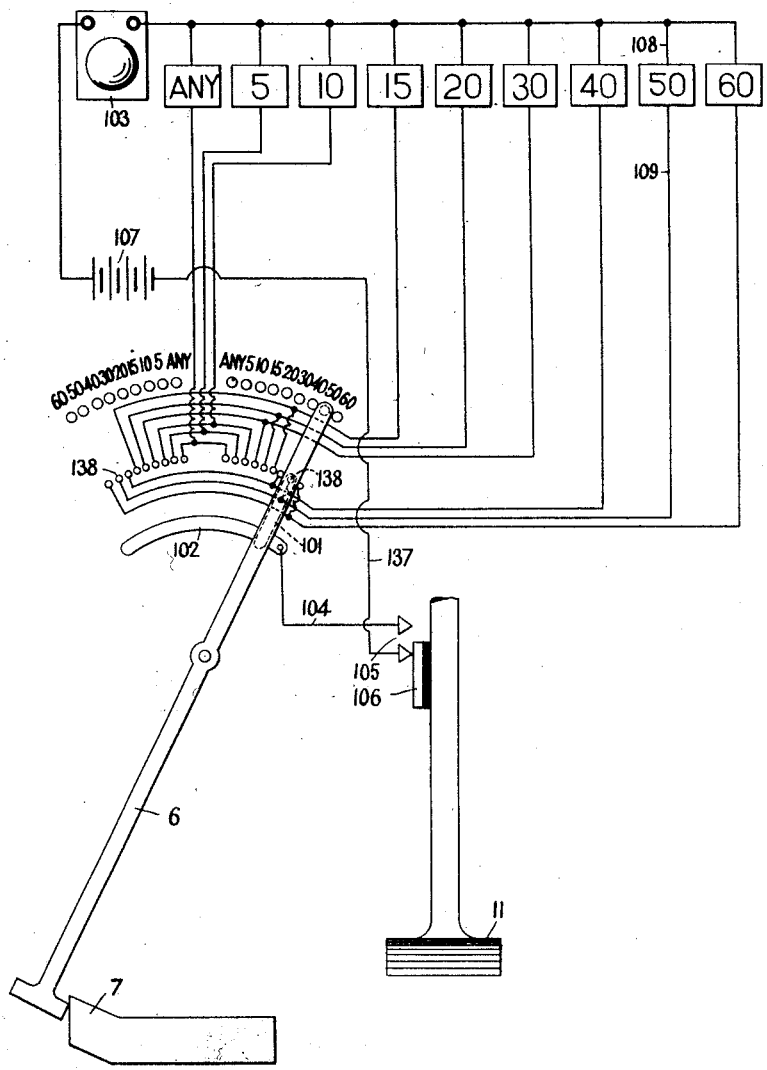
Figure 12:
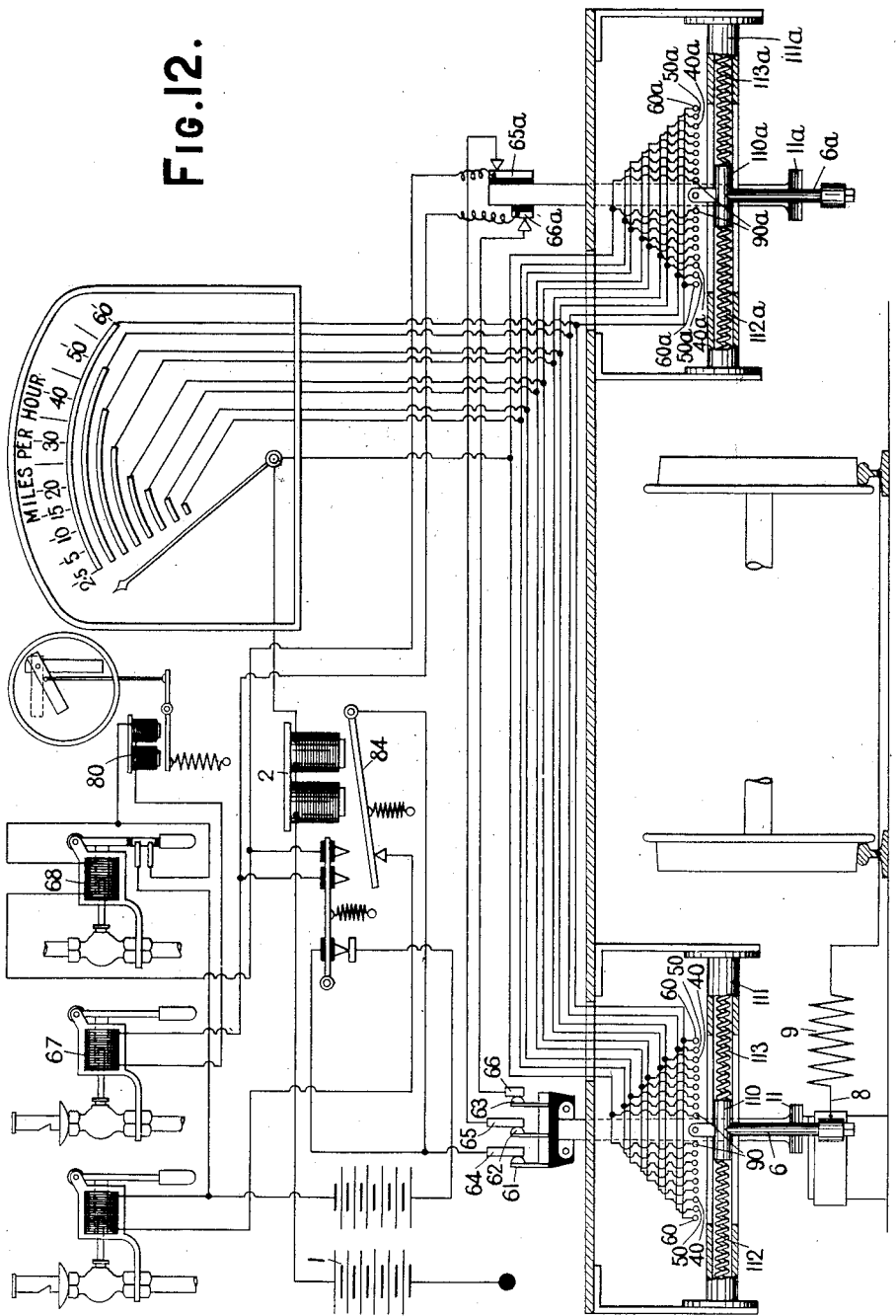
Figure 13:
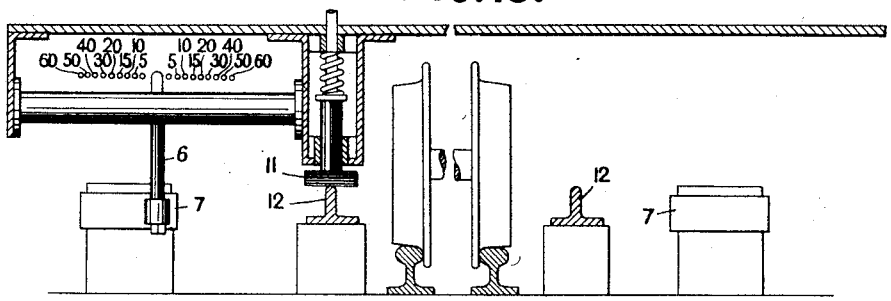
Figure 13:
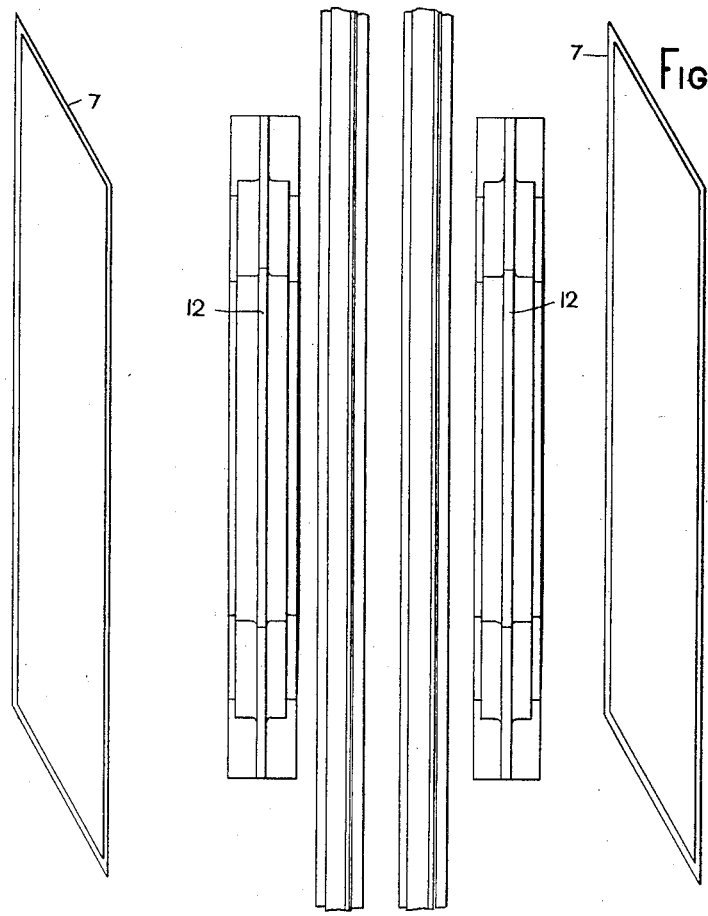
Figure 18:
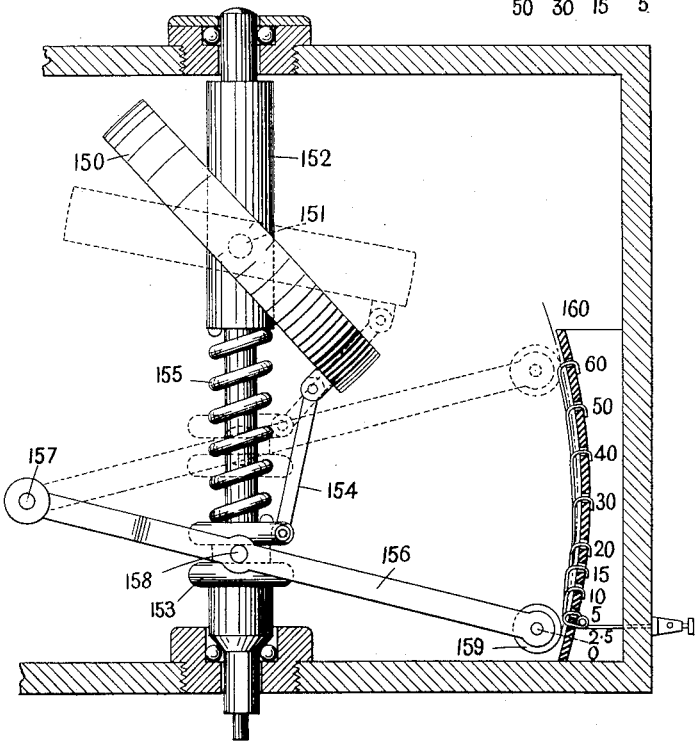

Figure 1 shows in side elevation and in cross section a compound track contact adapted to produce a warning operation on a train and to move laterally and contact with a contacting device (hereinafter referred to as a controlling lever) which is mounted on the train and adapted to swing about a horizontal axis. Figs. 2 and 2ª show respectively in side elevation and in cross section a similar compound track contact for producing a stopping operation on a train. Fig. 3 is a plan corresponding to Fig. 2. Figs. 4 and 4ª show respectively in side elevation and in cross section a compound track contact adapted to produce a warning operation on a train and to contact with and effect the lateral displacement of a controlling contacting device which is kept vertical throughout its motion. Figs. 5 and 5ª show respectively in side elevation and in cross section a compound track contact similar to the one shown in Figs. 4 and 4ª but adapted to produce a stopping operation on a train. Fig. 6 is a plan corresponding to Fig. 5. Fig. 7 shows the arrangement of the track contacts at a curved portion of track. Fig. 8 shows the arrangement of track apparatus on any section of straight road where it is desirable to limit the speed of a train because it is running toward a dead end. Fig. 9 is a representation of one example of train apparatus which may be used in connection with apparatus according to this invention. Fig. 10 is a representation of another such example of train apparatus. Fig. 11 shows apparatus whereby an indication of the limit of speed is given to a driver when the train makes contact with track contacts. Fig. 12 represents apparatus used on the train and on the track when the compound track contacts are placed on the track outside the space between the running rails. Fig. 13 shows in cross section an arrangement of train apparatus and track apparatus when the track contacts are placed outside the space between the running rails, contacts which are adapted to produce warning or stopping operations and contacts which are adapted to move a controlling contacting device being provided on opposite sides of the track, and Fig. 13ª is a corresponding plan of the track contacts and rails. Fig. 14 shows an arrangement of contacting devices and track contacts wherein the contacting devices and track contacts are above the train, the headway being limited in space as, for example, in the case of the tunnels of an electric tube railway; and Fig. 14ª is a corresponding longitudinal section showing a track contact and part of a contacting device operated thereby. Fig. 15, which is drawn to a smaller scale than Fig. 14, is an underside view of the track contacts shown in Fig. 14. Fig. 16 shows apparatus whereby a train is prevented from traveling over a cross over at an excessive speed. Fig. 17 shows another example of apparatus whereby a train is prevented from traveling over a cross over at an excessive speed. Fig. 18 shows a device for use in causing a warning or a stopping operation on a train to be restrained or effected according to whether the train is traveling over a track contact at a permissible speed or at a greater than a permissible speed.

In the examples illustrated there are arranged on or about the railway track what may be termed compound track contacts. Each of the compound track contacts shown has a base of some suitable material as wood, and has a top contact plate 12 or 13 and a side contact plate 7 which is preferably arranged around the base as shown. This side contact 7 (which will hereinafter be referred to as a controlling contact) can be adapted so as to effect the lateral displacement of a contacting device (hereinafter referred to as a controlling lever or controlling contacting device).

The displacement "D" varies according to the predetermined maximum speed, being in the examples of complete apparatus illustrated the greater, the greater the predetermined maximum speed.

The controlling contacts 7 are of the shape shown in Figs. 3 and 6 so as to displace the controlling lever or contacting device 6 without shock or jar, and are so arranged that the controlling lever always interacts with and receives the maximum displacement by a controlling contact before the contacting with a contact 12 or 13 of a shoe 11 (Figs. 9, 10, etc.) of a contacting device, which is adapted to cause a warning or a stopping device to be operated by its displacement by a top contact 12 or 13. If desired the top contacts 12 or 13 may as shown in Figs. 13 and 15, be placed externally to the controlling contacts 7 instead of within the spaces bounded by them as shown in all the remaining figures except Figs. 11 and 18.

Except in the case of Figs. 14 and 15 the contacts 12 and 13 are adapted to give the contacting shoe 11 different displacements so as to bring about warning and stopping operations respectively. The contact 13 which is adapted to cause a stopping operation is in these cases preferably higher than the contact 12 which is adapted to bring about a warning operation.

The shoe 11 (Fig. 9) is attached to and insulated from the remainder of a suitable vehicle as a locomotive, and is adapted to be differently displaced or moved to different extents when interacting with track contacts such as 12 and 13 placed on or about or above the railway tracks and when not in interaction with the track contacts is returned to its lowest or normal position by a spring acting on it in addition to gravity, though it may be held in the normal position by one or more springs only or by gravity only. The part 19 of the shoe 11 is adapted to restrain mechanically or hold in their normal positions sector shaped pieces 21 and 22 pivoted at 23 and 24 respectively. To the sectors 21 and 22 are attached doors or the like 27 and 26 and armatures 57 and 56 respectively. These armatures pertain respectively to electromagnets 54 and 53. Against these doors 27 and 26 press piston rods 29 and 28 behind the pistons 41 and 33 of which is suitable fluid pressure as that of steam, air or gas, tending to move or push out the pistons 41 and 33, and in addition there are springs 32 and 31 on the piston rods 29 and 28 also tending to push the piston rods 29 and 28 out and thus open the doors 26 and 27. In addition to these forces acting on the doors tending to open them there is also the weight of the sectors which would alone be sufficient to cause them to fall or be moved unless restrained by some part, such as 19 of the shoe 11. The springs 32 and 31 might in some cases be omitted. The shoe 11 is arranged so that if it becomes displaced from its normal position its relative doors or sectors will be moved so as to produce on the train a warning or a stopping operation, or both. The casing in which the piston rod 28 is located comprises a compartment connected with the danger whistle 36 by a pipe 37 and also connected by a pipe 34 with a source of suitable fluid pressure as that of steam, air or gas. Normally this fluid pressure is cut off from the danger whistle 36 by the piston 33 which is pushed into the position shown in the figure by the door 26. When the door 26 falls or moves, the piston 33 is moved or forced out by the fluid pressure behind it and by the spring 31, communication is made to the pipe 37, and the danger whistle 36 is blown until the door 26 is replaced. The casing in which the piston rod 29 is located forms two separate compartments, one of which is connected by a large pipe with the train pipe 38 of the fluid pressure brakes and the other is connected by a pipe 43 with the cylinder 44, in which is a piston whose piston rod is connected directly or through a link with the driver's handle 46. The end of the casing near the door 27 is quite open to atmosphere when not blocked up by the door 27 and when this door 27 moves or falls the train pipe 38 is connected directly to atmosphere and the application of the brakes is effected. The compartment which does not communicate with the train pipe 38 is connected by a pipe 42 with a source of fluid pressure, such as aforesaid, and normally this fluid pressure is cut off from the cylinder 44 by the piston 41, which is pushed into the position shown in the figure by the door 27. When the door 27 falls or moves sufficiently, the piston 41 is moved or forced out by the fluid pressure behind it and also by the spring 32, communication is made with the pipe 43 and the cylinder 44, and the driver's lever 46 is forced over to the shut or off position.

When the locomotive interacts with a compound signal contact comprising a top contact 12 and a controlling contact 7, the shoe 11 is lifted or moved to such an extent that the part 19 is raised or moved clear of the sector 22 only, the sector 22 unless otherwise restrained, will at once fall or move carrying with it the door 26, and the danger whistle 36 will be blown until the door 26 is replaced in the position shown in the figure. It will be seen that while interacting with a signal contact, the sector 21 will not fall or be moved because the contacting face of the part 19 which engages with the sector 21 is longer than the contacting face which engages with the sector 22. When the locomotive interacts with a stop contact comprising a top contact 13 and a controlling contact 7, the shoe 11 is moved or displaced to a greater extent than when the locomotive interacts with a contact 12, and the part 19 is lifted or moved clear of both sectors 22 and 21. These will at once move or fall, carrying with them the doors 26 and 27 unless otherwise restrained, when the danger whistle will be blown, brakes will be applied, and the motive power of the train will be cut off. These operations will be performed when a locomotive interacts with a compound track contact and the current passing through the coils 53 and 54 is insufficient to hold the armatures 56 and 57 respectively. The sectors 22 and 21 may be returned to their normal positions shown in the drawings by suitable levers. Means may be provided for preventing the driver from restarting the train after it has been automatically stopped by a stop contact. For example, the lever for restoring the sector 21 may be kept in a locked box, the key of which is in the possession of the guard or some other official. Such means are described in the specification of my application, Serial No. 755686, filed 20th March, 1913. In order to prevent these warning and stopping operations from being effected, current of a predetermined normal strength must flow from the generator 1 through the coils of the electromagnet 2. The armature 45 is then attracted to contact with the arm 46, and the circuit of the generator 47 is completed through the contacts 48 and 49, arm 46, armature 45, wire 51, the coils of the electromagnets 53 and 54, and wire 55. The sectors 22 and 21 are then maintained in their normal positions as shown by the attraction of the armatures 56 and 57 by the electromagnets 53 and 54, and neither a warning nor a stopping operation is performed.

Should current whose strength exceeds the predetermined normal value flow through the coils of electromagnet 2, the armature 45 would be attracted with such force that the arm 46 would be lifted against the action of gravity and that of the springs 131 and 132 so as to break the circuit of the generator 47 at contacts 48 and 49, and in this way no electrical restraint would be brought to bear upon the sectors 22 and 21 when the train makes contact with a track contact, and a warning or a stopping operation would be produced in the manner hereinbefore described. Should current whose strength is below the predetermined normal value or no current flow through the coils of electromagnet 2, the armature 45 would not be attracted to make contact with the arm 46 and the same results would ensue as in the case of current whose strength is above the predetermined normal value.

The controlling lever 6 on being displaced on either side to the greatest extent to which a particular controlling contact can displace it, is adapted to come into contact with one of a series of insulated contacts marked respectively 90, 5, 10, 15, 20, 30, 40, 50, and 60. Of these numbers the first 90, refers to contacts corresponding (as hereinafter explained) to an unlimited speed, while the remaining numbers indicate the number of miles to which the contacts bearing these numbers correspond, and thus the speed limits pertaining to the various displacements of the controlling lever 6 by controlling contacts.

The contacts 90 are connected through the coils of the electromagnet 2 to the generator 1, while the speed limit determining contacts are connected with other contacts relating to corresponding speed limits which are adapted to contact in the manner hereinafter described with a device whose position depends on the speed of the train, for example, the moving part of a speedometer, hereinafter referred to, for convenience as the indicator of the speedometer.

The indicator of the speedometer when pointing to 0, does not make contact with any contact but on registering (for example only say) 2.5 miles per hour it contacts with all the contacts relating to speeds of from 2.5 miles per hour to 60 miles per hour. On registering any speed above 5 and not more than 10 miles per hour it contacts with contacts relating to speeds of from 10 miles per hour to 60 miles per hour, and on registering any speed above 10 and not more than 15 miles per hour, with the contacts relating to speeds of from 15 miles per hour, to 60 miles per hour, and so on. Thus, when registering a certain speed, it always connects into the circuit of the controlling current, the contact relating to that particular speed and all contacts relating to greater speeds up to a speed of 60 miles per hour, but disconnects the contact or contacts relating to speeds below that speed. On interacting with a controlling contact 7 relating to say a limiting speed of 30 miles per hour, the controlling shoe 6 will be displaced to contact with the contact 130 marked 30, and should the indicator of the speedometer be registering a speed not above 30 miles per hour, then if all is in order, current of predetermined normal value flows through the coils of electromagnet 2 from the generator 1, the circuit being generator 1, coils of electromagnet 2, wire 3, the indicator of the speedometer, the speedometer contact relating to 30 miles per hour, wire 35, to speed limit determining contact relating to 30 miles per hour on the controlling lever plate, the controlling lever 6 (which is insulated from the frame and normally maintained in its midway position by springs 52 and 58) the controlling contact 7, wire 8, the resistance 9, to the rails and frame of the locomotive and so back to the generator. The train in this way obtains clearance. Should, however, the speed of the train exceed the prescribed 30 miles per hour, and the indicator of the speedometer be registering a speed of more than 30 miles per hour, the restraining circuit would not be completed, as the indicator of the speedometer would be out of contact with the contact relating to 30 miles per hour. It is thus evident that the train is permitted to run at any speed equal to or less than the prescribed limit of speed but is warned if the speed exceeds that prescribed limit. The resistance 9 is placed in the circuit to insure that current of predetermined normal value shall not flow through the coils of electromagnet 2 should the resistance 9 be shunted owing to the occurrence of a short circuit. Thus, should a short circuit occur, current whose strength is greater than normal value would pass through the coils of electromagnet 2, and the circuit of the generator 47 would be broken at contacts 48 and 49, and the train would be warned on a contact 12 and stopped on a contact 13.

It is evident that instead of causing the controlling lever 6 to be connected with the frame by the controlling contact 7, the wire 8, the resistance 9, and the rails, the controlling lever 6 may be permanently connected with the frame, in the manner shown in Fig. 10.

When the train running on the up journey interacts with track apparatus intended to restrict the speed for trains running on the down journey or vice versa, the controlling shoe 6 is only displaced to its minimum extent so as to be out of contact with the track contact 12 or 13. It then makes contact with one of the contacts 90, and the speedometer contacts and indicator are then cut out of circuit, the circuit of the generator 1 being then completed through the coils of electromagnet 2, wire 3, wire 4, the contact 90, which is in contact with the controlling lever 6, and through the controlling lever 6, controlling contact 7, wire 8, resistance 9, to the rails and frame. The warning and stopping operations are thus restrained on the train and it may run at any desired speed. If desired the circuits of the generators 1 and 47 can be broken by contacts placed on the sectors 21 and 22, or extensions thereof, when the said sectors are moved or displaced from their normal positions as shown.

In the example shown in Fig. 10 the shoe 11 is, as in the case of the apparatus represented in Fig. 9, attached to, and insulated from any suitable part of a locomotive or brakevan or other suitable vehicle. The shoe 11 is adapted to be given different displacements by contact with track contacts such as 12 and 13, placed on or about or above the railway tracks and when not in contact with a track contact, is returned to its normal position by gravity and by a spring, although it may be returned to its normal position by one or more springs only or by gravity only. Attached to, and insulated from, the contact shoe 11 is a resilient bridging contact member comprising fingers 61, 62, and 63 adapted to bridge, when the shoe is in its outmost position (hereinafter referred to as "its lowest position") the contact plates 64, 65, and 66, so as to complete the circuits of the generator 47 by contacts 48 and 49, wire 71, contact plate 64, contact finger 61, and, thence by (a) contact finger 62, contact plate 65, wire 72, coil of solenoid 68, wire 73, contacts 74 and 75 (if bridged by handle 76) wire 77, and wire 78 back to the generator, thereby energizing solenoid 68 and holding closed the valve 70 controlling means either for shutting off the motive power of the locomotive, or for applying the brakes on the train, or both; and by (b) contact finger 63, contact plate 66, wire 25, coil of solenoid 67, wire 79, magnet 80, wire 81, wire 73, contacts 74 and 75 (if bridged by handle 76), wire 77, and wire 78 back to the generator 47, thereby energizing the solenoid 67 and keeping closed the valve 69 so as to prevent the danger whistle 36 from being blown, and also energizing the magnet 80 and attracting its armature so as to maintain the miniature visual signal in the clear or off position.

When the shoe 11 comes into contact with a warning contact 12 it is raised to such an extent that contact finger 63 passes off the contact plate 66 thereby breaking there, as far as the bridging contact member is concerned, the connection between the contacts 64 and 66, and so opening the circuit relating to the solenoid 67 and magnet 80, so that, if the said circuit is not otherwise maintained, the plunger of the solenoid 67 is forced out by whatever pressure may be acting on the valve 69, and the danger whistle 36 is blown and the miniature signal is raised into the on or danger position.

When the shoe 11 comes into contact with a stop contact 13, it is displaced to a greater extent than when it comes into contact with a warning contact so that the contact fingers 61 and 62 are also raised clear of the contact plates 64 and 65, thereby breaking the circuit of the solenoid 68, so that, if the said circuit is not otherwise maintained, the plunger of the solenoid 68 is forced out by whatever pressure may be acting on the valve 70, and the handle 76 (used for replacing the plunger) is moved so that the circuits of the generator 47 and the coils of solenoids 68 and 67, and magnet 80, are broken at the contacts 74 and 75.

It is intended that the opening of the valve 70, which is normally held closed by the plunger of the solenoid 68, should allow the admission of suitable fluid pressure as that of steam, air, or gas, to a suitable cylinder, the piston of which is adapted to shut off the motive power (such as steam or the like) of the locomotive and should also allow or cause the operation of means for applying the brakes on the train. Either the shutting off of the motive power, or the application of the brakes, or both, may be used for stopping the train. The operation of the line clear whistle 82 is also normally restrained by current from the generator 47, through contacts 48 and 49, wire 71, branch wire 83, armature 84, contact 85, wire 86, the coil of solenoid 87, wires 88 and 78. The valve 89 is thus kept closed and shuts off fluid pressure from the line clear whistle 82.

If current of a predetermined normal value flows from the generator 1 through the coils of electromagnet 2, the armature 84 is attracted to contact with contacts 92 and 93, and completes alternative paths to the solenoids 67 and 68 through wire 94 which is joined to wire 25, and wire 95 which is joined to wire 72. The circuit of the solenoid 87 is now however, broken at contact 85, the valve 89 is opened and the line clear whistle 82 is sounded.

Should current exceeding the predetermined normal value pass through the coils of electromagnet 2 the armature 84 would be attracted with sufficient force against gravity and the springs 96 and 97 to break contact between contacts 48 and 49 thereby breaking the circuit of the generator 47 and warning and stopping operations would be effected, and a line clear intimation given. This line clear intimation serves to indicate that the warning and stopping operations are effected owing to the passage of a current whose strength exceeds the predetermined normal value. Moreover should current whose strength is below the predetermined normal value flow through the coils of electromagnet 2, the armature 84 would not be attracted against gravity and the spring 96, and the train would be warned and stopped on the corresponding contacts. These warning and stopping operations will be restrained when the train interacts with a controlling contact 7 if its speed does not exceed the limit predetermined for that controlling contact. For example, when the controlling lever 6 interacts with a controlling contact 7 which is designed to limit the speed of the train to 30 miles per hour, the controlling lever 6 will be deflected so as to contact with the 30 miles per hour contact, and should the speedometer be registering a speed of 30 miles per hour or less, the circuit of the generator 1 would be completed, and current would flow from the generator 1 through the coils of electromagnet 2, wire 3, the indicator of the speedometer, the 30 miles per hour contact of the speedometer, wire 35, the 30 miles per hour contact of the controlling lever plate, the controlling lever 6, wire 98, resistance 9, to the frame and back to the generator 1. Current of predetermined normal value will thus flow through the coils of electromagnet 2 and the warning and stopping operations would be restrained. Should, however, as explained with reference to the example of apparatus shown in Fig. 9, the speed of the train exceed 30 miles per hour the indicator of the speedometer would be out of contact with the 30 miles per hour contact of the speedometer, the circuit of the generator 1 would not be completed, and the train would thus be warned and stopped in the manner hereinbefore explained.

In the example of apparatus shown in Fig. 10 the controlling current does not pass through the controlling contact 7. The controlling lever 6 must be insulated from the frame as otherwise the resistance 9 would be short circuited and a current whose strength has a greater than a predetermined normal value would pass through the coils of electromagnet 2 when results pertaining to an excess current would be obtained. As already explained with reference to Fig. 9, when the controlling lever 6 is moved on either side to interact with either of the contacts 90, the speedometer is cut out, and the train can then run at any speed. Also if desired the circuit of generator 1 can be broken at contacts placed on the restraining handle 76 when the latter is moved in a manner similar to the way in which the circuit of the generator 47 is broken.

It is evident that instead of connecting the controlling lever with the frame of the locomotive by means of the wire 98 and the resistance 9, the controlling contacts may in the case of apparatus shown in Fig. 10, be connected with the rails through a resistance 9, as in the case of apparatus described with reference to Fig. 9.

It is intended in the case of apparatus constructed as shown in Fig. 10, that suitable means should be provided for preventing a driver of a train from restarting the train after it has been automatically stopped.

Such means are described in the specification of my application, Serial No. 755688, filed 20th March 1913.

From the arrangement of track contacts at or near the two ends of a curve as shown in Fig. 7, it can be seen that a train running on the down journey and approaching the curve, will if its speed is excessive be warned on interacting with track contact 14 (which is a warning contact) and stopped on track contact 16 (which is a stop contact), the controlling lever 6 being displaced to an extent "D" corresponding with the permissible speed around the curve, and that when the train leaves the curve, the controlling lever 6 will only be moved sufficiently to make contact with one of the contacts 90, when it interacts with track contact 17 (which is a stop contact) and track contact 18 (which is a warning contact). Thus the train will be able to leave the curve at an unlimited speed.

When a train is running on the up journey, and interacts with track contacts 18 and 17, its controlling lever 6 will be moved to an extent corresponding to the predetermined maximum speed and the train will be warned and stopped should the speed be excessive, but when it interacts with track contacts 16 and 14, its controlling shoe 6 will only be moved sufficiently to make contact with one of the contacts 90 and the train will be permitted to run at any speed.

From the description of apparatus shown in Fig. 8, it is evident that a train would be warned on track contact 14 (which is a warning contact) and stopped on track contact 16 (which is a stop contact) should it attempt to run toward the dead end at an excessive speed, but that it may run away from the dead end at any desired speed.

It is preferred that apparatus an example of which is shown in Fig. 11 should be used in connection with these improvements. On the train there are a series of indicators of known type marked "Any", "5", "10", etc., to correspond to the predetermined maximum number of miles per hour, and on the controlling shoe 6 is placed an insulated contact plate 101 adapted to connect the contact plate 102 with various contacts corresponding with the various indicators of the apparatus. These contacts are connected through the indicating apparatus with a bell or buzzer 103 and an electrical generator 107. The contact plate 102 is connected by the wire 104 to contacts 105 which are normally disconnected but which are adapted to be connected by an insulated plate 106 carried on the shoe 11 when the shoe 11 has been displaced to a certain extent as by a warning or a stop contact. When a train interacts with a controlling contact designed say for a limit of speed of 50 miles per hour, the controlling lever 6 is moved into the position shown in the figure. The shoe 11 is then displaced to bridge the contacts 105 and the circuit of generator 107 is then completed through the bell or buzzer 103, wire 108, the apparatus for indicating 50 miles per hour, wire 109, contact 138, the insulated plate 101, contact 102, wire 104, contacts 105, and wire 137. The bell or buzzer 103 is then sounded and the indicating board indicates that the safe limit of speed is 50 miles per hour. Similarly when the train interacts with a controlling contact 7 designed for another limit of speed the respective indication will be given on the board and the bell or buzzer 103 sounded. This apparatus slightly modified can also be used when a controlling contact device is used which on being displaced laterally is always maintained vertical.

The controlling lever 6 and the shoe 11 have been shown as working in the space between the running rails, but cases may occur where this arrangement is impossible, and they must then be hung elsewhere. Fig. 12 shows an arrangement of apparatus to meet this contingency. It is obvious that when this is the case, to meet turntable problems, either the track apparatus must be duplicated and single sets of contacting devices be carried on the train or else the track apparatus is not duplicated but the sets of contacting devices are. In the example shown in Fig. 12 duplicate controlling contact devices 6 and 6ᵃ (which are adapted to be moved laterally and kept vertical during their movement) and duplicate shoes 11, 11ᵃ, are suspended so as to work on either side of the running rails. The normally closed circuits of the solenoids 67, 68, and 80 are adapted to be broken not only as in Fig. 10 at the contacts 65 and 66 but also at the contacts 65ᵃ, and 66ᵃ, so that either of the shoes 11 or 11ᵃ will cause the production of warning and stopping operations unless these are otherwise restrained. The two sets of contacts 60, 50, 40, etc., and 60ᵃ, 50ᵃ, 40ᵃ, etc., relating to the controlling contacting devices 6 and 6ᵃ respectively are connected in parallel with the corresponding contacts of the speedometer and thus either controlling contacting device will when displaced, complete the circuit of the generator 1 and the electromagnet 2, if all is in order and the speed not excessive, and warning and stopping operations will be restrained. In this case the controlling shoes are always maintained in the vertical position by guides 110 and 110ᵃ moving horizontally in cylinders 111 and 111ᵃ and are maintained in a normally central position by springs 112 and 112ª, 113 and 113ª, the contacting devices 6 and 6ª as before being insulated from the frame. The operation of the warning and stopping apparatus is similar to that described with reference to Fig. 10.

It is evident that train apparatus similar to that shown in Fig. 9 might easily be adapted for use in the case of track apparatus and contacting devices shown in Fig. 12. Also instead of using controlling contacting devices such as shown in this figure, controlling contacting levers as shown in preceding figures might be employed, the train apparatus and track contacts being correspondingly modified.

In Fig. 13 is shown another arrangement of contacting devices and apparatus for use outside the space between the running rails. In this case the track apparatus is duplicated and the contacting devices 6 and 11 on the locomotive need not therefore be duplicated as in the case of the arrangement shown in Fig. 12. A further modification of the apparatus consists in the separation of the track contacts 7 from the track contacts 12 and 13. If preferred however the type of track apparatus shown in preceding figures may be used in which the contact 12 or 13 is surrounded by the controlling contact 7, the contacting devices 6 and 11 being correspondingly arranged. The mode of operation is the same as that described with reference to either Fig. 9 or Fig. 10, according to whether train apparatus as shown in the former or in the latter figure is employed. Any other arrangement of the contacts 7 and 12 or 13 may be used. For example, the controlling contact 7 or contact 12 or 13 or both may be placed overhead, the contacting devices being arranged accordingly. The controlling contacting device 6 may in this case be replaced by a pivoted controlling lever and the train apparatus and controlling contacts correspondingly modified.

Where as in the case of an electric tube railway there is a limited headway, or a headway which is not sufficient to allow a contacting device such as 11 (Figs. 9 and 10) to be displaced vertically to two different extents corresponding respectively to a warning and a stopping operation, an arrangement such as is shown in Fig. 14 is employed. In this case the shoe 11 is replaced by two upwardly extending similar shoes 114 and 115, each of which when displaced to a small extent breaks a normally closed circuit, or is moved clear of a restraining element such as a door or sector when train apparatus such as that shown in Fig. 9 is used. The track contacts in this case are attached to the roof of the tunnel, and may be in a single set as shown in the figure, contacting devices 6 and 6ª and warning contacting devices 114 and 114ª being provided or the contacts 7 and 12 may be duplicated and a single contacting device 6 or 6ª and a single contacting device 114 or 114ª used, the remaining apparatus being correspondingly modified. The central contacting device 115 relates to the stopping operations and is displaced from its normal position by suitable ramped contacts 13 attached to the roof of the tunnel as shown in longitudinal cross section in Fig. 14ª. A very slight displacement of the shoe 115 breaks at contacts 65, the circuit of the solenoid 68, and unless otherwise restrained, a stopping operation will be effected. Similarly a slight displacement of either of the shoes 114 or 114ª will break at contacts 66 and 66ª the normally closed circuits of the solenoid 67 and electromagnet 80, and, unless otherwise restrained a warning operation will be effected. The connections of the contacts 60, 50, 40, etc., and 60ª, 50ª, 40ª, etc., relating to the controlling contacting devices 6 and 6ª, with the corresponding speedometer contacts and the electromagnet 2, are identical with those shown in Fig. 12, and have been omitted for convenience. Warning or stopping operations will thus always be performed on the train on interacting with the roof apparatus if the speed is excessive owing to the removal from certain contacts of the indicator of the speedometer. If the speed is not excessive, a restraining current flows from the generator 1, through the coils of electromagnet 2, the circuit being completed through one of the speedometer contacts and the corresponding contact of either of the sets of contacts relating to the controlling contacting devices 6 and 6ª. When the motive power of the train is electricity, the main power circuit can be broken at contacts normally closed by the restoring handle 76 of the solenoid 68 when the latter is deënergized.

An underview of the track contacts on the roof of the tunnel is shown in Fig. 15. It will be seen that when a train on its down journey interacts with the roof apparatus at J, it would, should its speed be excessive, be warned at J, and if its speed before the train arrives at K has not been sufficiently reduced, stopped at K, but that the train is able to run past L regardless of its speed, its controlling contacting device 6 being displaced at L only to the amount corresponding to an unlimited speed. On the other hand a train running on the up journey would be warned at L and stopped at K should its speed be excessive but can run past J at any desired speed. The shoes 114, 114ª and 115 are maintained in their normal positions as shown by suitable springs. If it is desired to avoid the use of the duplicate contacts 66ª, the shoes 114 and 114ª may be made to operate a single shaft which when displaced would disconnect the contacts 66. The train apparatus, in so far as it relates to the production of warning and stopping operations is similar to that shown in Fig. 10. It is obvious however, that apparatus such as is shown in Fig. 9 can be suitably adapted to the requirements of roof apparatus and contacting devices described with reference to Fig. 14. It is further obvious that controlling contacting devices and controlling track contacts such as are used in the case of apparatus shown in Figs. 9 and 10 might be employed.

A method of preventing a train from passing from one line to another at an excessive rate of speed is illustrated by Fig. 16. For example, when a train passes from a fast line to a slow line the speed limit may be 15 miles per hour, and it is necessary to warn and stop it should it approach the cross over at any speed exceeding this limit. This is accomplished in the example of apparatus shown in this figure, by placing near a cross over warning and stopping track apparatus similar generally in design to apparatus hereinbefore described, but differing therefrom in that each track contact has a movable end 131 which when a signalman moves the points to make the fast road or the slow road is correspondingly deflected to either one side or the other. The position occupied by these shaped ends or noses 131 when the road is made for the fast line is as shown in the figure. It will be seen that a train running on the down journey toward the cross over will have its controlling contacting device deflected to the right that is to say, it will be displaced to an extent which will allow the train to run at any desired speed. When the train is running in the up direction away from the cross over it will also have its controlling contacting device displaced to an extent which will allow the train to travel at any desired speed. When however the signalman moves the points to enable the train to pass from the fast line to the slow one, the movable ends or noses 131 will be moved into the dotted positions, and the controlling contacting device 6 deflected to some definite extent corresponding to the predetermined maximum speed, and should the train exceed the speed limit it woud be warned and stopped as hereinbefore described.

Another method of preventing a train from traveling over a cross over at an excessive speed, in which no movable ends or noses of the track apparatus are used, is illustrated by Fig. 17. The track contacts are in this case so shaped, that when a train interacts with warning or stopping track contacts the controlling contacting device 6 is always displaced to the amount which, if the points are set for the fast road, would permit the train to travel at any rate of speed. The restraining circuit of the locomotive is somewhat modified for this purpose, the contacting shoe 11 which in the examples of apparatus hereinbefore described was not in the circuit of the controlling current is in this case included therein. When the fast road is made, the points are set in the position shown. The restraining circuit of the generator 1 is now completed from generator 1 through one of the coils of electromagnet 2, wire 3, wire 4, the contact 90 which is in contact with the controlling contacting device 6, the controlling contact device 6, controlling contact 7, wire 8, resistance 9, contacts 117 and contacts 118 which are bridged when the points are set correctly for the fast road by suitable point detectors, wire 129, to the rails, and frame of the locomotive, and back to the generator 1. The train is thus permitted to run at any desired speed. When the points are set to enable a train on the down journey to pass on to the slow line, the contacts 117 and 118 are now not bridged, and the connection with the rails of the controlling contacts 7 of the warning and stopping track contacts is broken, but the contacts 119 and the contacts 120 are bridged. The external generator 121 which may be placed either in the signal box or at the side of the track is now connected with the contacts 12 and 13 and with the rails, and, when a train interacts with these contacts, current will flow from generator 121, through wire 122, track contact 12 or 13 as the case may be, the shoe 11 which is insulated from the frame, thence by wire 123 to an additional contact 124 placed on the speedometer, the insulated contact 125, placed on the indicator of the speedometer, wire 126, to the other coil of the electromagnet 2, wire 127, resistance 128, to the frame and rails, wire 129, contacts 120 and 119, and back to generator 121. If all is in order current of a predetermined normal value will now pass through the coil of electromagnet 2, its armature will be attracted and warning and stopping operations will be restrained as hereinbefore described. It will be seen that the additional contact 124 on the speedometer only contacts with the insulated contact 125 when the speedometer is registering speeds of 15 miles per hour or less, and when this is the case and all is in order, the train will obtain clearance. But should the speed be excessive this circuit would be broken at contact 124, and the train would be warned and stopped on track contacts 12 and 13 respectively. The remainder of the train apparatus used in this case may be similar either to that described with reference to Fig. 9 or that described with reference to Fig. 10. The resistances 9 and 128 are so adjusted as to allow current of a predetermined normal value to flow when a circuit including either of them is completed and all is in order.

In Figs. 9, 10, 12, 14, and 17, the speedometer indicator and the various speedometer contacts have been represented diagrammatically. Fig. 18 shows in detail a practical method of effecting and breaking contact with contacts according to the speed of the train. The apparatus shown in this figure is of the type which is operated by centrifugal force and comprises a comparatively heavy ring 150, pivoted on a horizontal spindle 151, which is connected to a vertical rotating spindle 152 of the type shown in the figure. The spindle 152 is conveniently supported on ball bearings to overcome friction at both the top and bottom bearings, and is driven in any convenient method at a speed which varies with the speed of the train. A sleeve 153 which is connected by a link 154 to a lug on the ring 150, slides up and down on the spindle 152 against the action of the spring 155. The up or down movement of the sleeve 153 is communicated to an arm 156 pivoted at 157, by means of a groove cut in the sleeve 153 in which slide pins 158, and the free end of the arm 156 carries a light contact roller 159 which, as the sleeve 153 moves up or down moves over the surface 160 into which are let light insulated resilient contacts marked 5, 10, 15, 20, 30, 40, 50, 60, the lengths of these contacts increasing in the order mentioned as shown in side elevation in Fig. 18ª. The contact roller 159 is thick enough to contact simultaneously with the eight resilient contacts shown. As the speed of the spindle 152 increases the ring 150 also rotates at an increased speed and tends to assume the horizontal position owing to centrifugal force. When stationary the position of the ring 150 is as shown in full lines in the diagram and the contact roller 159 is then not contacting with any of the eight contacts. When the train is moving at a speed of 2.5 miles per hour, the sleeve 153 is lifted against the action of the spring 155 by the centrifugal action owing to the rotation of the ring 150 at a speed corresponding to the train's speed of 2.5 miles per hour, and the roller 159 makes contact simultaneously with all of the eight contacts. As soon as the speed exceeds 5 miles per hour, the roller passes off from contact 5, when the speed exceeds 10 miles per hour, the roller passes off from contact 10 and so on. When the speed is 60 miles per hour the ring 150 and the sleeve 153 assume the position shown in dotted lines. The range of from 2.5 to 60 miles per hour affords a convenient range over which the instrument may be calibrated. The various contacts 5, 10, 15, etc., are connected as shown in Figs. 9, 10, etc., to the corresponding controlling lever contacts and the arm 156 (insulated if desired) is connected to the coils of electromagnet 2 (Figs. 9 and 10). The sleeve 153 may run on ball races to minimize friction, and any mechanism suitable for moving a needle or indicator over a graduated scale which registers miles per hour for the driver's information may be operated by the arm 156 or sleeve 153.

Each train should be equipped with some suitable automatic brake.

The foregoing description indicates preferred arrangements of apparatus according to this invention, but it is evident that various modifications may be made, without departing from the invention.

What I claim and desire to secure by Letters Patent of the United States is:—

1. Railway safe-running apparatus comprising a speed-selecting device located on a train, a track device located on the track and adapted to give the aforesaid device a displacement corresponding to a predetermined maximum speed or a displacement corresponding to an unlimited speed according to the adjustment of a movable part of said track device, means located on said train and adapted to change its position according to the speed of said train and adapted, when said speed-selecting device is given the first mentioned displacement by the said track device, to cause the production of a danger indication on said train when said means is in a position corresponding to a speed exceeding said maximum speed, and means located on said train and adapted, when said speed-selecting device is given the second mentioned displacement by said track device, to prevent the production of said danger indication.

2. Railway safe-running apparatus comprising a speed-selecting device located on a train and a track device located on the track and adapted to give the aforesaid device a displacement corresponding to one speed when said train is traveling in one direction past said track device and a displacement corresponding to another speed when said train is traveling in the opposite direction past said track device.

3. Railway safe-running apparatus comprising a speed-selecting device located on a train, a track device located on the track and adapted to give the aforesaid device a displacement corresponding to a predetermined maximum speed when said train is traveling in one direction past said track device and a displacement corresponding to an unlimited speed when said train is traveling in the opposite direction past said track device, means located on said train and adapted to change its position according to the speed of said train and adapted, when said speed-selecting device is given by said track device said displacement corresponding to said predetermined maximum speed, to cause the production of a danger indication on said train when said means is in a position corresponding to a speed exceeding said maximum speed, and means located on said train and adapted, when said speed-selecting device is given said displacement corresponding to an unlimited speed, to prevent the production of the danger indication.

4. Railway safe-running apparatus comprising an indicating device located on a train, a restraining device located on said train and adapted normally to prevent the operation of said indicating device, two restraint-removing devices located on the track and adapted to displace said restraining device so as to cause it to lose its restraining influence on said indicating device, a speed-selecting device located on said train, a speed-determining track device located on said track and adapted to give said speed-selecting device a displacement corresponding to a predetermined maximum speed when said train is at one of said restraint-removing devices, speed-responsive means located on said train and adapted to change its position according to the speed of said train and adapted, when said speed-selecting device is given said displacement by said speed-determining track device, to prevent the operation of said indicating device when said means is in a position corresponding to a speed not exceeding said maximum speed, a special speed-determining track device adapted to give said speed-selecting device a displacement corresponding to an unlimited speed when said train is at the other of said restraint-removing devices, means adapted, when said speed-selecting device is given said displacement by said special speed-determining track device, to prevent the operation of said indicating device, and means partly on said train and partly on said track for enabling a signalman to allow the operation of said indicating device if, when said train is at said special speed-determining track device, said speed-responsive means is in a position corresponding to a speed exceeding a predetermined limit.

5. Railway safe-running apparatus comprising an indicating device located on a train, a restraining device located on said train and adapted normally to prevent the operaton of said indicating device, two restraint-removing devices located on the track and adapted to displace said restraining device so as to cause it to lose its restraining influence on said indicating device, an electromagnetic system located on said train and adapted, when energized, to restrain the operation of said indicating device, a speed-selecting device located on said train, a speed determining track device located on said track and adapted to give said speed-selecting device a displacement corresponding to a predetermined maximum speed when said train is at one of said restraint-removing devices, speed-responsive means located on said train and adapted to change its position according to the speed of said train and adapted, when said speed-selecting device is given said displacement by said speed-determining track device, to close an electrical circuit of said electromagnetic system when said means is in a position corresponding to a speed not exceeding said maximum speed, a special speed-determining track device adapted to give said speed-selecting device a displacement corresponding to an unlimited speed when said train is at the other of said restraint-removing devices, circuit-closing means adapted, when said speed-selecting device is given said displacement by said special speed-determining track device, to close an electrical circuit of said electromagnetic system, and means partly on said train and partly on said track for enabling a signalman to prevent the aforesaid closing by said circuit-closing means of a circuit of said electromagnetic system and to permit an electrical circuit of said electromagnetic system to be closed by said speed-responsive means when said speed-selecting device is given said displacement by said special speed-determining track device if said speed-responsive means is in a position corresponding to a speed not exceeding a predetermined limit.

6. Railway safe-running apparatus comprising an indicating device located on a train, a restraining device located on said train and adapted normally to prevent the operation of said indicating device, two restraint-removing devices located on the track and adapted to displace said restraining device so as to cause it to lose its restraining influence on said indicating device, an electromagnetic system located on said train and adapted, when energized, to restrain the operation of said indicating device, a speed-selecting device located on said train, a speed-determining track device located on said track and adapted to give said speed-selecting device a displacement corresponding to a predetermined maximum speed when said train is at one of said restraint-removing devices, speed-responsive means located on said train and adapted to change its position according to the speed of said train and adapted, when said speed-selecting device is given said displacement by said speed-determining track device, to close an electrical circuit of said electromagnetic system when said means is in a position corresponding to a speed not exceeding said maximum speed, a special speed-determining track device adapted to give said speed-selecting device a displacement corresponding to an unlimited speed when said train is at the other of said restraint-removing devices, circuit-closing means adapted, when said speed-selecting device is given said displacement by said special speed-determining track device, to close an electrical circuit of said electromagnetic system, switch points, and means located partly on said train and partly on said track and adapted to be caused by the movement of said switch points to prevent the aforesaid closing by said circuit-closing means of a circuit of said electromagnetic system and to permit an electrical circuit of said electromagnetic system to be closed by said speed-responsive means when said speed-selecting device is given said displacement by said special speed-determining track device if said speed-responsive means is in a position corresponding to a speed not exceeding a predetermined limit.

7. Railway safe-running apparatus comprising an indicating device located on a train, a restraining device located on said train and adapted normally to prevent the operation of said indicating device, two restraint removing devices located on the track and adapted to displace said restraining device so as to cause it to lose its restraining influence on said indicating device, an electromagnetic system located on said train and adapted, when energized, to restrain the operation of said indicating device, a speed-selecting device located on said train, a speed-determining track device located on said track and adapted to give said speed-determining device a displacement corresponding to a predetermined maximum speed when said train is at one of said restraint-removing devices, speed-responsive means located on said train and adapted to change its position according to the speed of said train and adapted, when said speed-selecting device is given said displacement by said speed-determining track device, to close an electrical circuit of said electromagnetic system when said means is in a position corresponding to a speed not exceeding said maximum speed, a special speed-determining track device adapted to give said speed-selecting device a displacement corresponding to an unlimited speed when said train is at the other of said restraint-removing devices, one track current path located on said track and adapted to be completed and broken by a signalman and, when completed, to complete a circuit through said electromagnetic system when said train is at said special speed-determining track device and at said other restraint-removing device, and a second track current path located on said track and adapted to be broken when the aforesaid track current path is completed by the signalman, and to be completed by the signalman only when the aforesaid track current path is broken, and adapted, when completed, to complete a circuit through said electromagnetic system when said train is at said special speed-determining track device and at said other restraint-removing device only when said speed-responsive means is in a position corresponding to a speed not exceeding a special predetermined maximum speed.

8. Railway safe-running apparatus comprising an indicating device located on a train, a restraining device located on said train and adapted normally to prevent the operation of said indicating device, restraint-removing apparatus located on the track and adapted to displace said restraining device so as to cause it to lose its restraining influence on said indicating device, an electromagnetic system located on said train and adapted, when energized, to restrain the operation of said indicating device, a speed-selecting device located on said train, a speed-determining track device located on the track and adapted to give said speed-selecting device a displacement corresponding to a predetermined maximum speed when said restraining device is displaced as aforesaid, a second speed-determining track device located on the track and adapted to give said speed-selecting device a displacement corresponding to an unlimited speed when said restraining device is displaced as aforesaid, speed-responsive means located on said train and adapted to change its position according to the speed of said train, an electrical circuit extending through said electromagnetic system and adapted to be closed by the coöperation of said speed-responsive means and said speed-selecting device when said speed-selecting device is given a displacement as aforesaid by the first mentioned speed-determining track device and said speed-responsive means is in a position corresponding to a speed not above said predetermined maximum and to be broken when said speed-selecting device is given a displacement as aforesaid by said first mentioned speed-determining track device and said speed-responsive means is in a position corresponding to a speed exceeding said maximum speed, and another electrical circuit extending through said electromagnetic system and adapted to be completed by said speed-selecting device without the coöperation of said speed-responsive means when said speed-selecting device is displaced as aforesaid by said second speed-determining track device.

Dated the second day of July one thousand nine hundred and thirteen.

ARTHUR REGINALD ANGUS.

Witnesses:
 Geo. C. Corsellis,
 W. A. Prescott.